United States Patent [19]

Goldberger et al.

[11] Patent Number: 5,028,314
[45] Date of Patent: Jul. 2, 1991

[54] HYDRODESULFURIZATION WITH CAKED CATALYST REMOVAL

[75] Inventors: Mark F. Goldberger, Mobile, Ala.; Peter L. Yarnot, Moss Point, Miss.

[73] Assignee: Chevron Research Company, San Francisco, Calif.

[21] Appl. No.: 16,806

[22] Filed: Feb. 20, 1987

[51] Int. Cl.$^5$ ............................................. C10C 45/02
[52] U.S. Cl. ................................ 208/216 R; 208/217; 208/152; 134/22.12; 134/22.18; 422/178; 422/219; 422/232
[58] Field of Search ................. 288/58, 176, 173, 171, 288/152, 210, 254 H, 251 H, 217, 216 R, 143; 422/178, 181, 213, 216, 219, 232; 134/22.12, 22.14, 22.18

[56] References Cited

U.S. PATENT DOCUMENTS

| | | | |
|---|---|---|---|
| 2,669,531 | 2/1954 | Petkus | 134/22.18 |
| 2,925,382 | 2/1960 | Kent et al. | 422/219 |
| 3,775,805 | 12/1973 | Mitchell et al. | 15/385 |
| 3,920,537 | 11/1975 | Walker | 134/22.12 |
| 4,018,623 | 4/1977 | Walker | 134/22.12 |
| 4,259,294 | 3/1981 | Langhout et al. | 422/219 |
| 4,398,852 | 8/1983 | Milligan | 208/152 |
| 4,502,946 | 3/1985 | Pronk | 208/171 |
| 4,591,428 | 5/1986 | Pronk | 422/213 |
| 4,630,779 | 12/1986 | Svuchi et al. | 422/184 |
| 4,642,223 | 2/1987 | Al-Saigh | 422/219 |

Primary Examiner—Anthony McFarlane
Attorney, Agent, or Firm—T. G. De Jonghe

[57] ABSTRACT

Heavy oils containing metal contaminants are hydrodesulfurized in a reactor containing a series of fixed beds of catalyst. The catalyst particles become caked together during the hydrodesulfurization process, possibly due to formation of metal sulfides and carbonaceous deposits, and the caked catalyst is removed by a hydro drilling method. The hydro drilling is preferably commenced by drilling a central opening through the catalyst beds. The catalyst particles and chunks are cut from the bed and removed from the reactor vessel through catalyst dump openings at the bottom of the vessel. Preferably, the dump openings are maintained open by hydro lancing as the cutting of catalysts in the upper part of the vessel loosens the catalyst so that the catalyst will drop down the central opening and thus out through the catalyst dump openings at the bottom of the reactor vessel.

18 Claims, 1 Drawing Sheet

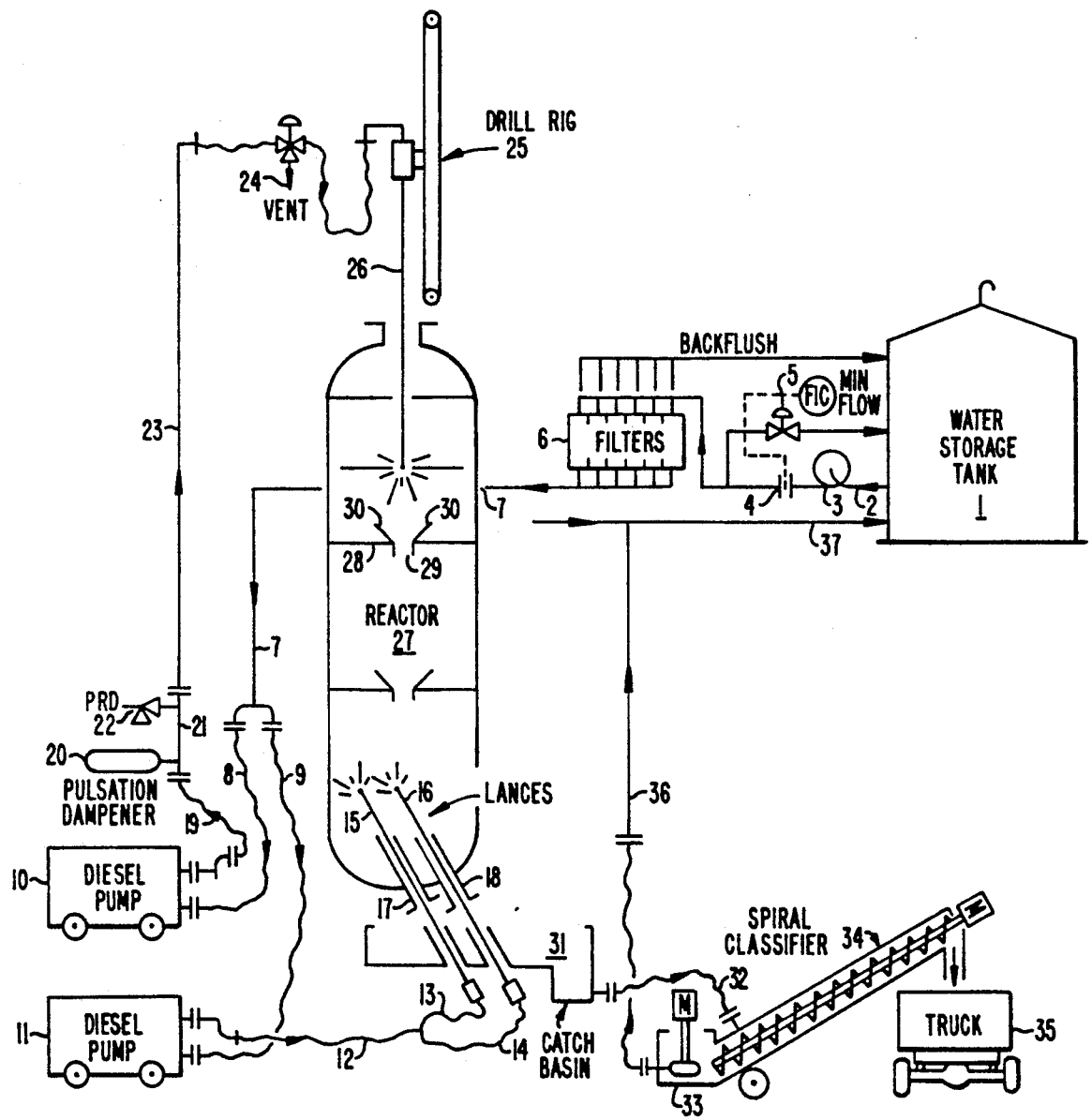
FIGURE

HYDRODESULFURIZATION WITH CAKED CATALYST REMOVAL

BACKGROUND OF THE INVENTION

The present invention relates to desulfurization of metal-contaminated heavy oils using fixed catalyst beds, and particularly to an overall hydrodesulfurization process wherein the catalyst is periodically removed from the reactor and then replaced with fresh catalyst.

Hydrodesulfurization is a well-known process. In general, it involves contacting oils at elevated temperatures and pressures with a catalyst to convert organic sulfur compounds to sulfur-free hydrocarbons and hydrogen sulfide. The hydrogen sulfide can be readily removed from the hydrocarbons and the reduced sulfur content hydrocarbons are a more desirable fuel in the sense of creating less sulfur oxides upon combustion. Also, the desulfurized hydrocarbons are improved feed materials for further refinery processing, such as hydrocracking or catalytic cracking or other upgrading refining processing. The hydrodesulfurization can be carried out in conjunction with other hydrotreating, such as hydrodenitrification and/or hydrodemetalation.

Catalysts used in hydrodesulfurization are well known. They typically include Group VI metals and/or Group VIII metals on a refractory support, such as alumina or silica or alumina-silica compositions. Examples of hydrodesulfurization catalysts are given in the following patents, the disclosures of which are incorporated herein by reference: U.S. Pat. No. 4,564,439; U.S. Pat. No. 4,495,308; U.S. Pat. No. 4,443,558; U.S. Pat. No. 4,066,574; U.S. Pat. No. 4,051,021; and U.S. Pat. No. 4,006,076.

The present invention is particularly directed to a fixed bed hydrodesulfurization process as opposed to a fluidized or ebullated or a moving bed process. Fixed bed hydrodesulfurization processes, and reactors therefor, are well known. See, for example, Kirk-Othmer, *Encyclopedia of Chemical Technology*, 3rd Edition, Vol. 19 at page 908; also Vol. 17 at page 201 to page 205.

Removal of catalysts from fixed bed reactors is typically done by opening the reactor and vacuuming catalyst particles out of the top of the reactor or removing closures from certain openings in the bottom part of the reactor and then allowing the catalysts to flow out of the reactors, much like grain might flow out of a silo.

Other means disclosed for removing catalysts include a published Japanese patent application, 84JP-274409, which discloses removal of a caked together exhausted catalyst from a reactor by (1) making a hole in the catalyst material, (2) filling the hole, in the presence of water, with a hydratable, expansive crumbling agent, (3) leaving the catalyst until it has been crumbled, and (4) removing the crumbled catalyst from the reactor.

U.S. Pat. No. 3,775,805 discloses a method and apparatus for clearing solid materials such as catalysts from elongated hollow structures, for example, catalyst-filled tubes of a steam methane reformer, by inserting into the hollow tubes a drill bit connected to a drive motor by a hollow drill stem, operating the motor to rotate the bit and break up the catalyst and simultaneously withdraw broken up catalysts by the application of vacuum to the interior of the drill stem which is in communication with the interior of the hollow structure of the apertures in the drill bit body.

In a different field, namely, coking for the production of coke and coker gas oil, coke, as opposed to catalyst, has been removed by methods involving drilling. In coke production processes, coke is removed from coke production vessels, which vessels are essentially completely hollow and contain no internals such as support means for fixed catalyst beds. See, for example, U.S. Pat. No. 3,880,357 which discloses apparatus for decoking the coke drum of a delayed coker after a vertical central hole has been cut. The U.S. Pat. No. 3,880,357 apparatus comprises a rotatable and vertically movable drill stem carrying water under pressure to nozzles supplying downward jet streams, the nozzles and the drill stems being mechanically linked to enable the radius of action of the jet streams to be incrementally increased while maintaining the nozzles vertical, so that the coke is removed in a series of cylindrical sections.

Similarly, at page 108 of the *Oil and Gas Journal*, May 17, 1982, a method is disclosed for decoking a shale oil recovery vessel. According to that method, the decoking system first guides a spinning head with water jets into the solid mass of coke. The jets bore a hole three to four feet in diameter in the center of the coke to the bottom of the tank. Then the boring head retracts and a cutting head is installed. Coke is cut into small chunks by the high pressure water jets so that it can be washed away through the bottom of the tank. The water in the system is recycled.

Coking operations are substantially different from catalytic hydrodesulfurization operations in that the coking operation is carried out without catalyst and without reactor internals that are required in catalytic hydrodesulfurization processes. One method which has been used to assist in catalyst removal where the catalyst is caked together due to interstitial deposits is to attempt to wash the deposits away sufficiently, using a heated mid boiling range oil, so that the catalyst will be sufficiently free to flow out the reactor through a bottom opening, or be vacuumed from the top of the reactor. However, in many instances this approach helps but is not sufficient so that the catalyst will flow to catalyst beds in a reactor that has been used for hydrodesulfurization of heavy feeds such as vacuum residuum.

SUMMARY OF THE INVENTION

According to the present invention, a process is provided for hydrodesulfurization of heavy oils containing metal contaminants, which comprises:

(a) contacting the heavy oil feed with hydrogen and catalyst particles comprising Group VI or Group VIII or both metals and an inorganic oxide refractory support at hydrodesulfurization conditions including an elevated temperature and pressure, the catalyst being disposed in a reactor vessel in a series of two or more fixed catalyst beds, which beds are supported by support means extending across a substantially horizontal plane in the reactor, and wherein after a period of at least 100 hours of on-stream time the catalyst particles become caked together;

(b) periodically removing the catalyst from the reactor by a method comprising hydro drilling a central opening through the catalyst beds along an axis extending vertically along the length of the reactor vessel, hydro cutting the catalyst beds into catalyst chunks and particles, and flowing the catalyst chunks and particles out through an opening in the lower part of the reactor and into spent catalyst receiving means; and (c) recharging fresh catalyst to the reactor vessel.

In carrying out the process of the present invention, we have found it preferable that the support means upon which the fixed catalyst bed rests, contains a centrally located hole. Preferably, the hole is at least three inches in diameter, more preferably at least six inches in diameter, and most preferably from about eight to twelve inches in diameter.

We have found that it is preferable to commence the catalyst removal operation by drilling through the center or approximate center of the catalyst beds, starting from the top and working downwardly through catalyst beds in the reactor vessel. The drilling is advantageously carried out by drilling along the center vertical axis of the reactor vessel or approximate center of the reactor vessel and progressing through the aforementioned centrally located hole in the support means.

Among other factors, the present invention is based on our finding that difficult-to-remove catalysts can be removed in a surprisingly efficient manner and in a relatively short time using the hydro drilling method as described herein. The catalyst removal method results in reduced downtime for a fixed bed, heavy oil hydrodesulfurization unit and consequent improved efficiency in operating such hydrodesulfurization unit. Using the present process, damage to internals in the reactor vessel is minimized while removing the caked catalyst.

According to a preferred embodiment of our process, first a central vertically extending hole is drilled from the top of the top bed downwardly; then this central hole is enlarged by further hydro drilling or cutting along the walls of the central hole; and then still further catalyst is hydro cut from the periphery of the central hole and allowed to drop to the bottom of the reactor vessel and removed. For successful and efficient operation, we have found that carrying out the drilling and cutting working from the top down is very advantageous.

In our catalyst removal operation, we have found that it is advantageous to provide a deflector plate attached to the circumference or outer perimeter of the centrally located hole in the support means. The deflector plate can help guide the hydro drilling toward the desired center or approximately centrally located hole in the support means and also thus help guide the hydro drilling to cutting a substantially centrally located hole vertically through the catalyst beds. We have found the deflector plate is especially helpful in guiding the hydro drilling through lower beds in the reactor vessel. Thus, for a multi bed reactor the deflector plate is especially advantageous in the support means for the second bed in the reactor vessel.

Preferably, the deflector plate has perforations or openings near the base where it connects to the catalyst support means, which perforations or openings are effective to allow catalyst to be washed or flushed radially inward and down through the central opening.

For efficient operation of the process of the present invention we have found it important to adjust the relationship of the water volumes used and the water pressure used. Large volumes of water result in slowing down the catalyst removal operation when the volume of water is more than the drain rate from the reactor vessel. The volumes of water used is preferably reduced and pressure increased (for example, by reducing the size of drill head nozzles) to achieve a balance between catalyst cutting and drilling speed, catalyst pulverization into fines and adequate flushing of the cut catalyst chunks and particles from the catalyst beds and the reactor. Relatively high volumes of water flow are desired, but the volumes of water used should not exceed, for extended periods of time, the rate at which the water will drain from the reactor vessel.

Preferred sizes for the drill head nozzles through which the water discharges in a jet stream for drilling, cutting and washing catalyst out of the catalyst beds are 1/32 to ⅜ inch, more preferably ⅛ to ⅜ inch, in diameter.

As indicated above, we have found that the pressure of the water used in the hydro drilling and cutting is an important factor in carrying out the process of our invention. Pressures which are too high have been found to result in catalyst pulverization and production of extensive catalyst fines with attendant severe plugging and other operational problems in the effluent water system and in the subsequent start-up of the hydrodesulfurization unit after the unit is recharged with fresh catalyst. Pressures which are too low have been found to result in an impractical catalyst removal because of drilling equipment jamming problems and because of unduly expensive time requirements to complete the catalyst removal and recharging operation for the hydrodesulfurization reactor vessel. In our process, preferably the water pressure used is below 12,000 psig, still more preferably, below about 6,000 psig for most of the drilling operations. Preferred operating ranges are between about 100 psig and 5,000 psig for most of the drilling operations. Pressures referred to are the pressures at the drill head. Typically the pressures are measured at the water pump outlet and these pressures are usually a sufficient reference point, but more precise drill head pressures can be calculated using normal pressure drop calculation methods for the length of pipe involved and any elevation difference.

According to a preferred embodiment of the present invention, a centrally located hole is drilled through the fixed catalyst beds at a water pressure to the hydro drill of between about 50 and 5,000 psig, more preferably between 100 and 2,000 psig, with this drilling carried out from the top of the reactor vessel through the top catalyst beds and progressing downwardly toward the bottom of the reactor vessel. Preferably the drilling progresses downwardly to an extent at least sufficient so that a hydro lance (which will be described more hereinbelow) can cut through to provide an opening extending from a catalyst dump opening in the reactor vessel up or over to the central hole. After the central hole is downwardly drilled using the aforesaid water pressure, then the central hole is preferably enlarged by drawing the hydraulic drill upwardly from a point near the bottom of the reactor vessel with concurrent hydro drilling at a water pressure of 500 to 5,000 psig, more preferably 1,000 to 3,000 psig. The drill head (first head) used for this initial drilling of the central opening is preferably provided with bidirectional water jet outlets with at least one jet, more preferably two or more, pointed downwardly when the drill head is in normal operating position, and at least one jet, more preferably two or more jets, for high pressure water discharge pointed upwardly. The upwardly pointed jets of water help in keeping the central opening clear when the drill head is drawn upward after completing the downward drilling first pass with the first drill head. The upwardly pointed jets of the first drill head can have a slight bias outward from true vertical, preferably 3 to 10 degrees out from true vertical. After drilling the central opening, the catalyst bed is preferably cut into chunks and particles at a hydro pressure of 500 to 6,000 psig, preferably at 2,000 to 5,000 psig, using a drill head providing high pressure water which jets radially out into the catalyst beds for hydro cutting of the caked catalyst. This jet or jets can be horizontally directed out to the catalyst bed from the drill head, or at a bias of 30 to 60 degrees from horizontal out into the catalyst beds, or a combination of horizontally directed and angle directed jets.

As described in more detail below, we have found that an especially advantageous embodiment of the present invention uses three different drilling heads. A first head, for the initial central opening drilling, provides bidirectional jets of high pressure water extending substantially vertically downward and vertically upward. A second drill head, used in a second drilling/cutting step, provides water jets for hydro cutting out radially into the catalyst bed from the central opening to thereby obtain an enlarged opening through the catalyst bed. Preferably the second head has nozzles providing water jets vertically up, vertically down and sideways out into the bed. More preferably the second head also has one or more nozzles which provide water jets at an angle, such as 45 degrees, upward from horizontal and one or more nozzles which provide water jets at an angle, such as 45 degrees, downward from horizontal. All directions are with respect to the head while in normal drilling position. A third head, used in a third step, provides jets of water which extend radially outward in defined high pressure pattern further than the second head. This third head is advantageous in reaching further extremities, out from the center of the caked catalyst bed, with high pressure water effective for cutting loose the caked catalyst and for washing it free.

It should be understood that in operation the three preferred heads, and preferred steps, as indicated above, can be used in overlapping or cyclic fashion. Thus, we have found it is often advantageous to revert to use of the first or second head even though the catalyst removal operation has progressed to use of the second and/or the third head for part of the catalyst removal operation.

Preferably the chunks and particles of catalyst and deposits are removed from the reactor vessel through one or more catalyst dump openings near the bottom of the reactor vessel. These dump openings preferably are kept open by continuous or periodic hydro drilling or lancing while (or immediately before or after) the catalyst is cut from the catalyst beds. We have found that the hydro drilling to keep the dump openings open is most advantageously done on a continuous basis while catalyst is being cut from the catalyst beds. If the cutting is carried out from the top down, as we have found is preferred, then the cut catalyst falls, as it is cut, into the central opening and drops via the central opening through the catalyst beds to the bottom of the reactor vessel, where the catalyst chunks and particles are removed. As stated above, the catalyst chunks and particles are preferably removed through a catalyst dump opening out the bottom of the reactor vessel. The dump opening preferably is placed into open communication with respect to the central opening through the catalyst beds by means including hydro drilling or lancing from the dump opening to the central opening. Preferred pressure for the water to the hydro drills or lances used to maintain the dump opening in open communication with the central opening is between 3,000 and 15,000 psig, more preferably between 3,000 and 12,000 psig.

BRIEF DESCRIPTION OF THE DRAWING

The drawing is a simplified schematic illustration of a preferred embodiment of the present invention wherein hydro drilling is done downwardly from the top of the reactor vessel and catalyst removal openings are maintained open by use of one or more hydro lances.

FURTHER DESCRIPTION

Referring now in more detail to the drawing, water is withdrawn from water storage tank 1 via line 2 and pumped by pump 3 via line 4 to filter 6. The flow rate of the water is controlled by flow indicator controller 5. Filtered water is withdrawn via line 7 from the filters and then passed to a large diesel pump, for example a 500-gallon per minute diesel pump, as indicated by 10 and a smaller, for example a 100-gallon per minute diesel pump as indicated by 11.

The pressurized water from the smaller diesel pump 11 is passed via line 12 and then either 13 or 14 into lances 15 or 16. The lances enter the reactor vessel 27 via catalyst dump openings as indicated by 17 and 18. These water lances are used to maintain the dump openings in open condition so that the catalyst may flow out of the reactor as it is drilled or cut from the reactor by hydro drill 26.

The term hydro is used herein to connote water. The water is used in liquid form. The terms hydro drilling and hydro cutting, or simply drilling or cutting, are used interchangeably herein. In some cases the term cutting is used more so when referring to hydro cutting or drilling radially out from the central opening cut through the catalyst beds in the first stages of the catalyst removal.

Referring again to the diesel pumps, a larger diesel pump indicated by 10 is used to increase the pressure of the water. The water is discharged via line 19 from the pump. Pulsation dampener 20 is used to even out pulsations in the pressure of the water. The pressure of the water can be controlled to preferred operating pressures for the hydro drilling by regulating the pump outlet pressures. As described previously, the pressure used is an important feature in carrying out the process of the present invention for catalyst removal.

Pressure Relief Device (PRD) 22 is incorporated as a safety pressure relief. Vent relief valve 24 can be used to cut the water flow to the drilling to allow change of the drill head. Water which is passed via line 23 is, during drilling operation, introduced to the reactor vessel via the hydro drill as indicated by 26.

The hydro drill is moved up and down in the reactor by the drill rig as schematically indicated by 25. The drill rig is preferably portable so that it can be moved out of position when catalyst removal is complete and also so that, in the case of a hydrodesulfurization unit with multiple reactor vessels, it can be moved from one reactor to another reactor that requires removal of caked fixed catalyst beds.

Water enters the drill rig at a swivel and travels through it and into the drill pipe and out the pipe nozzle or drill head. The swivel allows rotation of the drill pipe. Stems of drill pipe are added or removed by disconnecting pipe at the swivel, holding it in place with a clamping device and raising or lowering the swivel if needed. As indicated previously, up and down movement of the drill rig and rotation of the drill pipe are accomplished with a hydraulic control system which may be controlled at an operator control panel. The panel operator also can control water flow to the drill rig.

The drill pipes and nozzles are designed to travel through the relatively small opening in the support means between the reactor beds. Preferably, guides are installed in the catalyst support means as indicated by 30. The guides or deflector plates are attached to the opening 29. The guides or deflector plates are advantageous in directing the drill nozzles through the central hole in the support means.

The support means 28 are shown in simplified form in the drawing. The actual support means in operating units are complex. Typically the catalyst is supported on wire mesh screen, which in turn is supported by extensive structure, as the weight of the catalyst particles can extend up to many thousands of pounds. The support structure usually includes I beams or girders rigidly attached to the inside walls of the reactor vessel. Also, other internals directly under the support means are usually extensive. Such internals can include hydrogen quench nozzles or rings and gas/liquid distribution trays. These extensive internals complicate the application of the process of the present invention in that preferably an opening down the vertical length of the reactor vessel is drilled so that catalyst cutting can then proceed radially outwardly from such opening to cut the caked catalyst into chunks and particles for removal. To facilitate our process, preferably these internals are designed with a central opening which is at least three inches, more preferably six inches, and still more preferably eight to twelve inches, in diameter (or in width if rectangular in shape).

Preferably, according to our invention, the drilling is carried out at least as a two-step operation, more preferably as a three-step operation. A drill head with an bidirectional pattern (one or more upwardly pointed water outlets and one or more downwardly pointed water outlets) is preferably first used to drill a central hole from the top of the top fixed bed in the reactor through the bottom bed. Then the drill pipe is retracted and another drill head (second drill head) which provides at least two concentrated streams directed out from the central opening and into the catalyst bed is used to enlarge the central opening and/or cut the catalyst loose from the various fixed beds of the reactor. These concentrated or jet streams of water are directed out radially into the catalyst bed as opposed to being directed vertically up or down as are the hydro streams from the first drill head. One particularly preferred drill head for use as this second head has two outlets directed horizontally out from the head, two extending at 45 degrees up from horizontal and two at 45 degrees down from horizontal. Preferably this second head also has two outlets directed vertically downward. The second head preferably still further also has two outlets directed substantially vertically upward from the drill head in normal operating position for a total of ten or more outlets. Cutting can be accomplished from the top down or the bottom up, but preferably is done, according to the present invention, from the top down.

In the more preferred three-step operation, a third drill head is used which has outlet lines extending between four and 24 inches horizontally from the vertical center line of the drill when in normal operation position. Preferably the third head also has one or more outlets which provide downward directed water jets. The horizontally extended outlets of this third head, which typically are small diameter pipe with a nozzle on the end, are designed to provide a hydro stream which retains its high pressure and defined stream characteristic further out from the center of the drill line than the second drill head horizontal streams.

Referring again to the lances 17 and 18 at the bottom of the reactor vessel, preferably high pressure water from a smaller diesel pump is routed to these lances so that the lances can be effectively used to keep catalyst dump openings 17 and 18 in open condition. Thus, in operation the lances would be inserted through the catalyst dump nozzles to clean out the nozzle areas and breakthrough to the central hole which has been previously drilled down through the catalyst beds by drill means 26.

Water and wet catalyst flow out of the reactor dump nozzles 17 and/or 18 into catch basin 31. From catch basin 31 the catalyst in slurry-type condition is passed via line 32 to spiral classifier 34. The catalyst is transferred via spiral classifier 34 to truck 35 so that the spent catalyst can be removed from the hydrodesulfurization unit area.

After removal of the spent catalyst and completion of any final work on the reactor vessel internals, the reactor is then closed at the bottom and the operation of recharging the reactor vessel with fresh catalyst is commenced.

The catalysts used in the hydrodesulfurization process are generally supported non-precious heavy metal catalysts. These materials include an inorganic oxidic or silicious support or activated charcoal or the like with the desired metals deposited on its surface. Such supports include for example alumina, silica-alumina, silica, boria, titania, zirconia, and activated carbon. The metals employed are members of Groups VI and VIII of the Periodic Table of the Elements and include nickel, tungsten, molybdenum, cobalt and the like and mixtures thereof. Iron and vanadium are also suitable metals. The metals are generally present as oxides or sulfides. Conventionally known supported hydrodesulfurization catalysts such as NiMo, NiW, CoMo or CoW on alumina or silica-alumina or activated charcoal can be employed. Other examples of supported metal catalysts include NiFe, NiCo, and NiV. The amount of metal present on the catalyst can vary from 10% or less, i.e., 1 to 6% based on total catalyst weight up to 10 or 15% by weight or more.

Liquid hourly space velocity (LHSV) for the heavy oil feed passed over the fixed beds of catalyst is preferably in the range 0.05 to 5 LHSV, more preferably 0.08 to 2 LHSV.

Preferred hydrogen gas rates are from 1,000 to 10,000 SCF of hydrogen gas per barrel of heavy oil feed, more preferably 2,000 to 5,000 SCF hydrogen gas per barrel heavy oil feed. The hydrogen gas purity typically is 80 to 90%.

Preferred temperatures and pressures for the hydrodesulfurization are 500 to 1,000° F. and 1,000 to 5,000 psig, more preferably 600 to 900° F. and 1,500 to 4,000 psig.

After the reactor has been recharged with fresh catalyst, the start-up operation for the hydrodesulfurization process can be commenced.

The process of the present invention is preferably applied to fixed bed hydrodesulfurization processes wherein the feedstocks are atmospheric residuum or vacuum residuum, or combinations of various heavy oils with one or more of these residua. Atmospheric residuum is used herein to connote the bottoms fraction from substantially atmospheric pressure distillation, such as in an oil refinery. Similarly vacuum residuum is used to connote the bottoms fraction from a vacuum (subatmospheric) pressure distillation. The present invention is advantageously applied to heavy oil feedstocks which boil mostly above 800° F., more preferably mostly above 900° F. Thus, the normal boiling point of more than 50 weight percent of the heavy oil is preferably above 800° F., more preferably above 900° F. Particularly preferred heavy oil feeds for the present hydrodesulfurization process have normal boiling ranges almost entirely (90% or more) above 900° F.

The heavy oil feedstocks to the process of the present invention contain metal contaminants, usually at least ten ppm of metal contaminants from the group consisting of vanadium, nickel, and iron and mixtures thereof. More typically, the feedstock will contain at least about 50 ppm and often as much as 100 ppm or more of the aforementioned metal contaminants. The process of the present invention is particularly advantageous when the feed heavy oil contains 100 ppm or more of the metal contaminants, calculated by weight of the elemental metals. The metal contaminants are present in the heavy oil mostly as organic compounds, such as porphyrins. Metal contaminants can also be present as iron scale or various other debris, or also as calcium and/or sodium metal contaminants. As indicated previously, the metal contaminants are deposited in the pores of the catalyst and also in the interstitial space between the catalyst particles in the catalyst beds as the hydrodesulfurization and/or other hydroprocessing reactions progress. The deposition is believed to occur in the form of complex metal sulfides, complex metal salts, and/or also in the form of complex carbonaceous deposits. The metal sulfides, along with the carbonaceous deposits, in many instances, bridge across from catalyst particle to catalyst particle, thus creating a substantially solid or "caked" mass for the fixed catalyst bed. In some instances, the caking is strong in certain areas of the bed and weak or relatively non-existent in other areas or other beds of the reactor.

The process of the present invention is especially advantageously applied to feedstocks derived from crudes containing metal contaminants, such as vanadium and/or nickel and/or iron, wherein the metal contaminants come out of the heavy oil relatively readily. For example, certain crudes have organometallic compounds that relatively readily deposit metal sulfides, and also carbonaceous deposits, in the interstitial spaces between the hydrodesulfurization catalyst particles.

EXAMPLES

A heavy oil feed boiling mostly above 900° F. and having a metal content of more than 50 ppm by weight of V, Ni and Fe, was passed over a Group VI metal/Group VIII metal hydrodesulfurization catalyst for a run length of over one month. The catalyst size was approximately ¼" by 1/16", LHSV was in the range 0.8 to 2.0, hydrogen rate was in the range 2,000 to 5,000 SCF per barrel of heavy oil feed, temperature was between 600 and 900° F., and reactor pressure was between 1,500 and 4,000 psig.

The reactor was shut down and the catalyst beds were flushed with heated mid-distillate and stripped with hot hydrogen gas. Next the reactor and catalyst were allowed to cool to approximately 100° F. and were placed under inert gas (nitrogen) purge.

The spiral classifier and associated equipment, as described earlier in connection with the drawing, were put into place. The catalyst dump lines at the bottom of the reactor were opened and a portable drill rig was positioned at the top of the reactor vessel. Hydro drilling was commenced using 100 to 500 psig water pressure and the drilling progressed from the top bed down through three catalyst beds. The drill head (first drill head) used provided two hydro streams downwardly directed and two hydro streams upwardly directed. The upwardly directed streams were found helpful in keeping the drilling head free and in successfully completing the subsequent upward withdrawal of the drill after the initial downward pass through the catalyst beds. The initial central opening drilled downwardly through the fixed beds of catalyst was several inches in diameter. The catalyst bed supports were specially designed with centrally located openings to accommodate the central drilling. The catalyst support tray for the second bed contained a deflector plate in conical shape to help guide the hydro drilling to the center of the bed.

After drilling downwardly through the fixed catalyst beds, the hydro drill was withdrawn upwardly with the water pressure raised to approximately 1,000 to 2,000 psig.

Then a new drilling head (second drill head) was attached replacing the first drill head. The second drill head provided ten hydro jets of water: two directed downwardly, two upwardly, two at a bias (of approximately 45° to horizontal) upwardly, two at a bias (of approximately 45°) downwardly, and two directed sidewardly (horizontally). Hydro drilling with this second head was commenced from the top and progressed downwardly. Some back and forth vertical movement was used as this drilling progressed, but the basic operation was downward in accordance with our findings for preferred operation for successful and efficient hydrodesulfurization caked catalyst removal.

The hydro cutting operation with this second drill head enlarged the central opening to approximately four feet in diameter, except in the area of the support means. This hydro cutting operation was extended to the bottom of the lowest catalyst bed.

Simultaneous with the two above hydro drilling and cutting operations, hydro lancing was continuously conducted at the bottom of the reactor vessel, at a water pressure of approximately 5,000 to 10,000 psig, to maintain an opening for the catalyst chunks and particles to flow from the central opening into the opening leading to the catalyst dump nozzles and then out the dump nozzles.

After hydro cutting with the second drill head, a third drill head was installed in its place. The third drill head was designed to provide concentrated jets of water discharging from the drill head approximately horizontal (sideways) to the vertical axis of the reactor vessel. The third drill head was designed with horizontally projecting discharge lines of about one to one and one-half feet in length, with a discharge nozzle at the end of each projecting line. The third drill head also had two nozzles which provided downwardly directed hydro streams. The third drilling operation was also carried out working downwardly from the top of the top bed in the reactor vessel. Concurrently with this third hydro cutting operation the hydro lancing of the dump openings continued using a pressure between 5,000 and 10,000 psig.

Next the reactor vessel was filled with water to just below the support means for the top bed and the central part of the internals/support means for the top bed were removed. Then the water was drained from the reactor vessel and the hydro drilling and cutting was recommenced on the second bed, using the third drill head. Some cycling back and forth was done between the third drill head and the second and first drill head as needed to maintain the central opening in open condition.

After completing the removal of the caked catalyst from the second bed, the third and last bed was then removed using the procedure as used on the second bed. Much of the third bed was already removed by the hydro lancing as the catalyst in this bed was caked only moderately hard.

For substantially all hydro drilling and cutting operations the water flow rate was adjusted to less than the rate at which the reactor vessel would fill with water. However, occasionally the center opening would plug (particularly at the narrow opening through the support means) with catalyst cave in and this would cause a decrease in water flow out the dump nozzles and consequent rise in water level in the reactor vessel.

Catalyst removal was conducted as schematically indicated in the drawing.

Fresh catalyst was then recharged to the reactor working from the bottom up. Internals were replaced as the recharging progressed up the length of the reactor vessel. After the necessary reconnections were made, including returning and bolting into place the top manway to the reactor vessel, start up with the fresh catalyst was commenced.

Total turnaround time was less than one-month and the caked catalyst removal period was only a few days. This contrasts with prior attempts using vacuum and/or air hammers which were unsuccessful and also contrasts with prior hydro drilling attempts taking as much as quadruple the time, for example, 19 days, and costing as much as triple the cost of this example run.

What is claimed is:

1. A process for hydrodesulfurization of heavy oils containing metal contaminants, which comprises:
   (a) contacting the heavy oil feed with hydrogen and catalyst particles comprising Group VI or Group VIII or both metals and an inorganic oxide refractory support at hydrodesulfurization conditions including an elevated temperature and pressure, the catalyst being disposed in a reactor vessel in a series of two-or more fixed catalyst beds, which beds are supported by support means extending across a substantially horizontal plane in the reactor, and wherein after a period of at least 100 hours of on-stream time the catalyst particles become caked together;
   (b) periodically removing the catalyst from the reactor by a method comprising hydro drilling a central opening through the catalyst beds along an axis extending vertically along the length of the reactor vessel, hydro cutting the catalyst beds into catalyst chunks and particles, and passing the catalyst chunks and particles out through an opening in the lower part of the reactor and into spent catalyst receiving means; and
   (c) recharging fresh catalyst to the reactor vessel.

2. A process in accordance with claim 1 wherein the support means contains a centrally located hole at least three inches in diameter.

3. A process in accordance with claim 1 wherein the hydro drilling of the central opening is commenced from the top of the uppermost catalyst bed in the reactor vessel.

4. A process in accordance with claim 1 wherein water used for the hydro drilling is at a pressure of less than 12,000 psig.

5. A process in accordance with claim 3 wherein the water pressure used for hydro drilling the central opening, in an initial downward drilling pass, is between 100 and 1500 psig.

6. A process in accordance with claim 5 wherein the pressure is between 100 and 500 psig for most of the initial downward pass.

7. A process in accordance with claim 6 wherein the drill head used for the downward pass provides upwardly projecting jets of water and said jets are operated at a water pressure of 100 to 2000 psig during upward retraction of the drill head to the top of the reactor vessel after the downward pass.

8. A process in accordance with claim 7 wherein the water pressure for the upward retraction pass is between 1,000 and 2,000 psig.

9. A process in accordance with claim 1 wherein the reactor vessel contains one or more catalyst dump openings near the bottom of the reactor vessel; the catalyst chunks and particles are removed through the catalyst dump openings; and the dump opening is placed into open communication with respect to the central opening through the catalyst beds by means including drilling from the dump opening to the central opening.

10. A process in accordance with claim 9 wherein the dump opening is placed into open communication with respect to the central opening by hydro drilling.

11. A process in accordance with claim 10 wherein open communication for the catalyst dump opening near the bottom of the reactor vessel is maintained during cutting of catalyst near the upper part of the reactor vessel whereby catalyst chunks and particles fall, after the chunks and particles are cut loose in the upper part of the reactor vessel, down through the central opening and exit the reactor vessel via the catalyst dump opening.

12. A process in accordance with claim 11 wherein the catalyst dump opening is maintained open by continuous hydro drilling or lancing through the catalyst dump opening up toward the central opening.

13. A process in accordance with claim 12 wherein the reactor vessel is provided with more than one catalyst dump opening, and while catalyst chunks and particles are being removed from the reactor vessel via one of the dump openings, another dump opening is being drilled or lanced into open communication with the central opening.

14. A process in accordance with claim 2 wherein the centrally located hole in the support means is at least six inches in diameter.

15. A process in accordance with claim 2 wherein extending from the centrally located hole in at least one of the support means is a deflector plate which angles radially outward from the center of the hole and which is capable of assisting in guiding a hydraulic drilling force through the hole.

16. A process in accordance with claim 15 wherein the reactor vessel contains three or more beds of catalyst and a deflector plate is located in the support means for the second bed.

17. A process in accordance with claim 16 wherein the deflector plate extends upwardly from the hole and initial drilling of the central opening is done downwardly from the top of the reactor vessel.

18. A process in accordance with claim 1 wherein the catalyst removal comprises:
(i) hydro drilling downwardly, using a first drill head, through the catalyst beds from the top of the reactor vessel to the bottom at least sufficiently far to provide a central opening which is in open communication with an opening out the bottom of the reactor vessel;
(ii) hydro drilling downwardly, using a second drill head, through one or more of the catalyst beds, wherein the second head provides hydro cutting out radially into the catalyst bed from the central opening to thereby obtain an enlarged opening through the catalyst bed; and
(iii) hydro drilling through at least one of the catalyst beds using a third drill head, wherein the third drill head provides hydro cutting out radially into the catalyst bed from the enlarged opening.

* * * * *